B. GODWIN.
FRICTION CLUTCH.
APPLICATION FILED MAR. 1, 1912.

1,061,172.

Patented May 6, 1913.

2 SHEETS—SHEET 1.

B. GODWIN.
FRICTION CLUTCH.
APPLICATION FILED MAR. 1, 1912.

1,061,172.

Patented May 6, 1913.

2 SHEETS—SHEET 2.

Witnesses:
H. Hunsberger

Inventor:
Benjamin Godwin
by B. Singer
Atty

UNITED STATES PATENT OFFICE.

BENJAMIN GODWIN, OF MARPLE, ENGLAND.

FRICTION-CLUTCH.

1,061,172. Specification of Letters Patent. Patented May 6, 1913.

Application filed March 1, 1912. Serial No. 680,919.

*To all whom it may concern:*

Be it known that I, BENJAMIN GODWIN, a subject of the King of Great Britain and Ireland, residing at Marple, in the county of Chester, England, have invented new and useful Improvements in Friction-Clutches, of which the following is the specification.

This invention has for its object a friction clutch capable of extremely nice adjustment, that is put into action by two, three, five or more right and left hand screws at equal angles with each other, that is if there be three they stand at 120 degrees, if five, at 72 degrees apart. They each draw two nuts against the opposite sides of a single or split ring which may be the driving or the driven member of the clutch.

The invention is best described by the aid of the accompanying drawings, in which—

Figure 1:
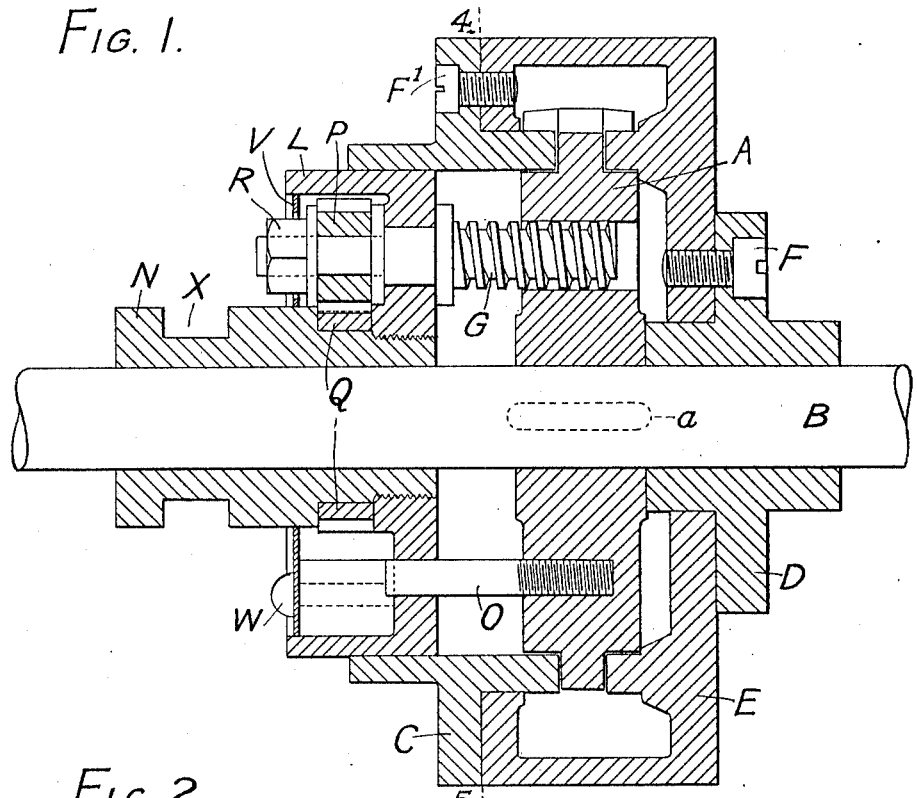
Figure 2:
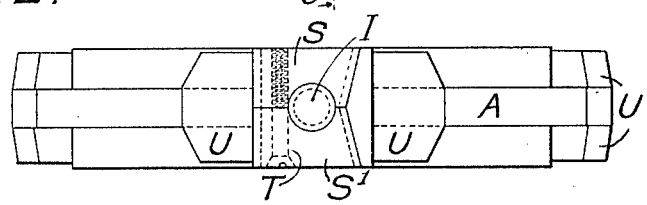
Figure 3:
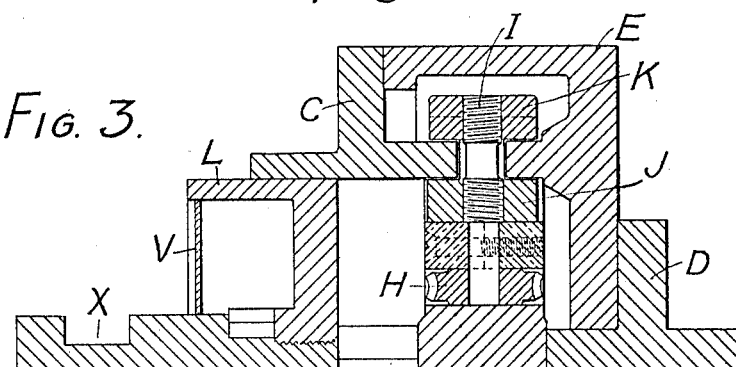
Figure 4:
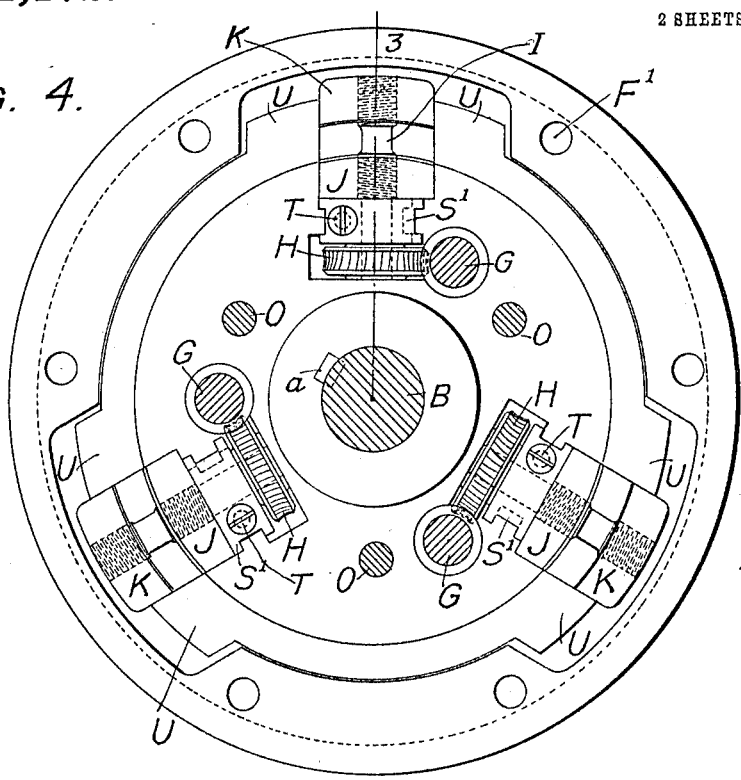
Figure 5:
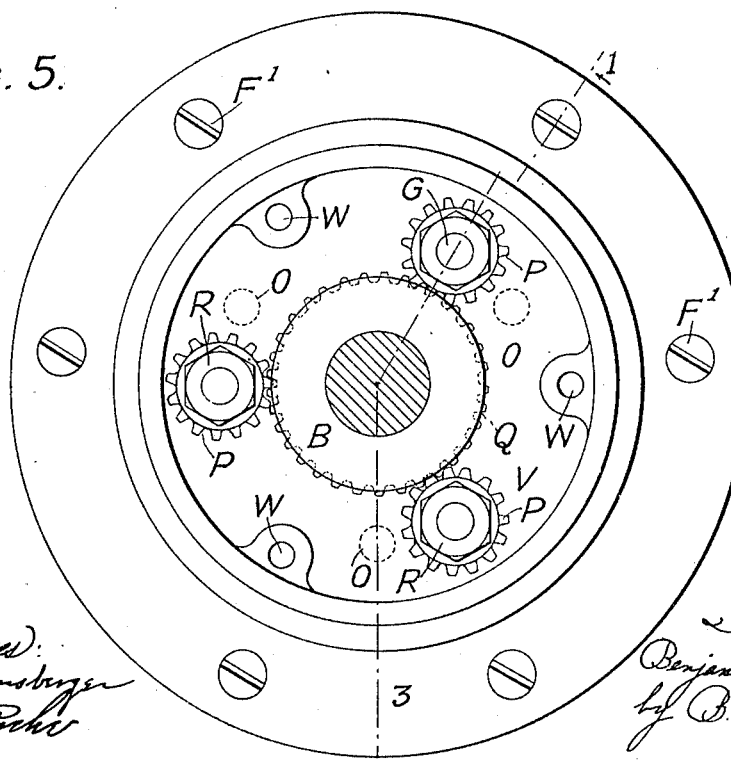

Figure 1 is a transverse section through the lines 1—3 of Fig. 5. Fig. 2 is a plan view of the ring A Fig. 1, which is permanently keyed to the shaft B. Fig. 3 is a section from the center through the line 3 of Fig. 4. Fig. 4 is a transverse section through the line 4—5 of Fig. 1 with the parts C, L, and N Fig. 1 and parts attached thereto removed. Fig. 5 is an end view of Fig. 1, with the cover plate V Fig. 1 removed.

On these B is the shaft and A a casting keyed to the shaft by key $a$; D and E parts freely revolving on the shaft, but fixed together rigidly by screws F. The part C is attached to F by screws $F^1$ so that the whole revolves together.

G are spindles each having a worm actuating a worm wheel H. There are three of these spindles and worm wheels. The worm wheels are each keyed on a spindle I Fig. 3, having right and left hand screws and nuts J and K thereon adapted to fit the rings C, E. A piece L is firmly screwed on another piece N, the two sliding freely on the shaft. These two form the actuating member of the clutch. This member can slide on a feather in the shaft, or not, as desired, but in any case is prevented from rotation by the pins O and the spindles G, which cause it to rotate with the part A which is keyed to the shaft. On the spindles G are toothed wheels P, each engaging with a toothed ring Q which can turn on N. These wheels are normally screwed tight on to the spindles G by means of nuts R. Examining now Figs. 2, 3 and 4, each spindle I is held in a bearing formed of two parts S, $S^1$ held together by the pin T. The parts S, $S^1$ are slipped into openings formed with projecting ledges in the part A. The parts S $S^1$ and openings being formed on one side with inclines being shown in plan in Fig. 2, to hold the spindle bearings central with the part A. Any other suitable arrangement of bearings for the spindles I on the part A may be used. The ring A, Fig. 4, has a projection U on each side of the nut K to form an extra bearing for this nut.

V, Figs. 1, 2, and 5 is a plate fitting loosely around the nuts R and screwed to the parts L by the screws W so as to keep out dust.

By revolving any of the nuts R the respective spindles G with its wheel P is revolved, this wheel P revolves the ring Q and thus causes all the three spindles G to revolve synchronously. By this means any wear and tear in the device can be taken up.

The mode of action is as follows: Either the shaft B with part A or the parts E or D may be driven by motive power and drive the other when the clutch is engaged. The usual clutch handle works in the groove X and by it the parts N L with the spindles G can be moved toward the fixed member A or away from it, and the spindles G act as racks upon the worm wheels H, and turn them during such movement in one or the other direction. Preferably by moving the spindles G inward the worm wheel and the right and left handed screws are turned so as to draw the nuts J and K together till they grip the rings E C between them very firmly and cause the members A and C E to turn together. If the part N L with the screws G is moved in the reverse direction, the worm wheels are turned by the spindles G in the reverse direction and the nuts are moved apart and release the rings E and C, and the clutch is disengaged.

I claim as my invention:—

1. A friction clutch comprising in combination, a shaft, a disk like member keyed to said shaft and provided with sets of clutch members movable radially with respect to said shaft and having rim engaging portions on opposite sides of said disk like member and concentrically arranged with respect to said shaft, a clutch member rotatively mounted on said shaft and having rims concentric with respect to said shaft and extending between said clutch-members on the opposite sides of said disk like member, radially disposed threaded rods rotatively mounted in said disk like member for actuating said clutch members, worm wheels for said rods, a device shiftable on said shaft and provided with a freely rotatable annular rack, worm spindles rotatively mounted on said shiftable device and disposed in concentric relation with respect to said shaft and engaging said worm wheels and said disk like member, and pinions fixed to said worm spindles and meshing with said annular rack, substantially as described.

2. A friction clutch comprising in combination, a shaft, a disk like member rigidly mounted on said shaft, a clutch member rotatively mounted on said shaft and having rims extending toward said disk member on opposite sides thereof, clutch shoes carried by said disk member for engaging said rims, radially disposed threaded rods in said disk member for actuating said shoes, worm wheels on said rods, a shiftable clutch means on said shaft, worm spindles rotatively mounted in said shiftable means in parallel relation with said shaft and in mesh engagement with said worm wheels, said spindles engaging openings in said disk member for preventing independent rotation of said disk member with respect to said shiftable means, pinions rigidly mounted on said worm spindles, and an annular rack freely mounted on said shiftable means and meshing with said pinions, substantially as described.

In testimony whereof I have hereunto set my hand in the presence of two witnesses.

BEN. GODWIN.

Witnesses:
CARL BOLLÉ,
RIDLEY JAMES URQUHART.

Copies of this patent may be obtained for five cents each, by addressing the "Commissioner of Patents, Washington, D. C."